Patented May 9, 1939

2,157,365

UNITED STATES PATENT OFFICE 2,157,365

PROCESS FOR PRODUCING 1,4-ETHYLENIC GLYCOLS

Thomas H. Vaughn, Niagara Falls, N. Y., assignor to Carbide and Carbon Chemicals Corporation, a corporation of New York No Drawing. Application November 6, 1936, Serial No. 109,444

17 Claims. (Cl. 260—635)

The present invention relates to the hydrogenation of acetylenic glycols; and more especially it concerns the selective catalytic hydrogenation of 1,4-acetylenic glycols of the type

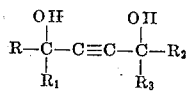

wherein R, $R_1$, $R_2$, and $R_3$ designate respectively hydrogen, or the same or different alkyl or aryl radicals, with the resultant production of the corresponding 1,4-ethylenic glycols. The expression "ethylenic glycols" is employed herein to designate olefinic or alkenic diols which have a double bond in the molecule. Substantially no further hydrogenation of the latter occurs. Among 1,4-acetylenic glycols adapted for hydrogenation by the present invention may be mentioned 2,5-dimethyl-2,5-dihydroxyhexyne-3, (sometimes designated as "acetylene pinacol" and as "acetylene pinacone"); symmetrical diamyl-dimethylbutynediole; and symmetrical dibutyl-diethylbutynediole.

The invention involves the hydrogenation of a 1,4-acetylenic glycol in the presence of a nickel catalyst containing a small amount, even a trace, of an alkaline material such as caustic soda or other alkaline water-soluble compound. Preferably the nickel catalyst employed is of the type described in United States Patent 1,628,190 to Murray Raney, but modified by the addition thereto of the aforementioned alkaline material. The catalyst desirably is suspended in a solution of the said acetylenic glycol in a volatile organic solvent for the reactants, such as methanol, ethanol, methyl and ethyl acetates, ethyl and isopropyl ethers, dioxan, and acetic acid. However, water may be substituted for the organic solvent, as hereinafter indicated.

The hydrogenation may be conducted under a wide range of pressures, but atmospheric or superatmospheric pressures are preferred. The temperatures employed for the hydrogenation may be varied over a considerable range. Temperatures within the range from 0° to 120° C. have proven very satisfactory. It will be understood, of course, that the upper temperature suitable for use is limited by the boiling point of the material used as a solvent; and that such boiling point varies with the pressure under which the hydrogenation is conducted.

In the hydrogenation the triple bond is partially saturated with the formation of a double bond which is not further reduced. The formation of the cis or trans isomer may be regulated by a suitable choice of solvents.

The reaction mixture from the hydrogenation is treated to separate therefrom the last traces of catalyst. If the resultant ethylenic glycols are present in sufficient concentration they will crystallize from this stripped liquid. Usually, when a volatile organic solvent is employed, the solvent is removed, at least in large part, by distillation. The crystals of the resultant solidified ethylenic glycol, which may be slightly impure, readily may be purified by recrystallization from a suitable solvent, such as benzene.

The important and unique function performed in this invention by the nickel catalyst containing at least a trace of an alkaline compound is noteworthy. By the use of these catalysts, apparently the ethylenic glycol produced is not perceptibly further hydrogenated. When, on the other hand, a palladium catalyst is used in the hydrogenation of these 1,4-acetylenic glycols, the first mol of hydrogen is rapidly absorbed after which a second mol of hydrogen is absorbed. When platinum is substituted for the palladium, the hydrogenation proceeds at a uniform rate with the formation of a completely saturated glycol.

The following examples serve to illustrate the invention:

Example 1

A nickel catalyst was prepared by adding to 23 g. of a 50% nickel-silicon alloy, in successive portions, 34 g. of sodium hydroxide dissolved in 200 cc. of water, and the mixture then was boiled gently for 1.5 hours, water being added at intervals to maintain the original volume of solution. The mixture thereafter was allowed to cool, whereupon the catalytic material settled on the bottom of the vessel as a black residue. This precipitate was separated and washed with water until the washings gave no precipitate when treated with a few drops of a 10% solution of barium chloride. The washed precipitate was further washed three times with methanol to remove water, and then was used in the process without further treatment.

The use of only a sufficient number of water washes to remove all of the silicate ions—indicated by the barium chloride test—insures the presence of sufficient sodium hydroxide in the catalyst to render it active in the process. If the washing has been too extreme, thus limiting or destroying the activity of the catalyst, this activity is renewed by the addition of a small amount, even traces, of the same or other alkaline compound.

The above-mentioned catalyst was suspended in a solution of 125 grams of 2,5-dimethyl, 2,5-dihydroxyhexyne-3 in 125 grams of methanol. Hydrogen was bubbled through this mixture at atmospheric pressure through gas diffusion tubes for a period of 2.5 hours. During the hydrogenation the vessel containing the mixture warmed up. After hydrogenation was complete, the vessels cooled, and the solution was decanted from the catalyst. The latter was washed twice with methanol, and then was ready for reuse.

The solution was filtered to remove the last traces of the catalyst; and the methanol then was distilled from the filtered solution. The residue solidified, due to separation of the ethylenic glycol, 2,5-dimethyl-2,5-dihydroxyhexene-3. One hundred and twenty-three grams of this ethylenic glycol were obtained, corresponding to a yield of 98.5%. The product was slightly impure; and was purified by recrystallization from benzene. The purified product melted between 73° and 75° C.

As is shown by the following Example 2, super-atmospheric pressure effectively may be used in the hydrogenation without substantially hydrogenating the ethylenic glycols produced.

*Example 2*

A nickel catalyst, prepared substantially in the manner described in Example 1, was added to a solution of 94 grams of 2,5-dimethyl-2,5-dihydroxyhexyne-3 in 80 grams of methanol. The resultant suspension was placed in a stainless steel autoclave and treated with hydrogen at atmospheric temperature, under a pressure of 200 pounds per square inch gauge, for 18 hours. Hydrogen however was absorbed only during the first hour. The mixture was allowed to settle, and the supernatant liquid decanted from the catalyst.

A second portion of 94 grams of the 2,5-dimethyl-2,5-dihydroxyhexyne-3 in 80 grams of methanol was added to the catalyst and the procedure repeated, the treatment with hydrogen however lasting only 5.5 hours. The catalyst was separated from this solution; and the combined solutions from the two hydrogenations were centrifuged to remove last traces of the catalyst. The resultant solution was treated in the manner described in Example 1, yielding 177 grams of 2,5-dimethyl-2,5-dihydroxyhexene-3, corresponding to a yield of 94%. The purified compound melted between 74° and 74.4° C.

The product produced in Examples 1 and 2 is the cis isomer. This is shown not only by its melting point but by the fact that at 22° C. less than 1 gram thereof is soluble in 100 cc. of petroleum ether. By conducting the hydrogenation of the acetylene glycol in water as a solvent, the trans isomer is produced. Thus:

*Example 3*

A nickel catalyst prepared from 23 grams of 50% nickel-silicon alloy in the manner described in Example 1 was suspended in a solution of 100 grams of 2,5-dimethyl-2,5-dihydroxyhexyne-3 in 300 cc. of water. The suspension was treated with hydrogen for 3.5 hours at room temperature and atmospheric pressure in a series of gas diffusion tubes. The catalyst was then filtered from the solution, and the latter was allowed to stand overnight at 1° C., upon which 12 grams of 2,5-dimethyl-2,5-dihydroxyhexene-3, melting at 67° C., crystallized from solution. The identity of this product as the trans isomer was established by the determination of a mixed melting point with a sample of the trans isomer prepared by hydrogenation of the said acetylenic glycol with a palladium catalyst, and also by the fact that between 6 and 7 grams of the material were soluble in 100 cc. of petroleum ether at 22° C.

The hereindescribed method of hydrogenating acetylenic glycols has many important advantages over those previously used. In all earlier procedures it has been necessary to interrupt the hydrogenation at a certain stage in order to prevent the further reduction of the major portion of the ethylenic compound to a completely saturated derivative. This interrupted procedure not only requires close control but always gives a mixture of products, since even during the early stages of the reduction a certain amount of the resultant ethylenic material is being further reduced. The separation of these ethylenic and saturated derivatives usually is very complicated.

The product obtained by the method of the present invention does not contain any fully saturated compounds and, upon the removal of the solvent used in the hydrogenation, is pure enough for practically all uses. Thus, for example, the crude ethylenic glycol may be used in the preparation of furane derivatives such as

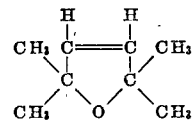

with excellent results.

Although the invention has been exemplified in connection with the selective hydrogenation of acetylene pinacol, for purposes of illustration, it will be understood that the invention is applicable generally to the selective reduction of the class of 1,4-acetylenic glycols of the type

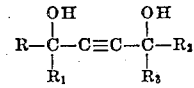

wherein R, $R_1$, $R_2$, and $R_3$ respectively designate either hydrogen, or the same or a different alkyl or aryl group, whereby the triple bond is completely eliminated in the presence of the partial reduction product, the latter of which is not further reduced by the hydrogenation, and whereby the formation of cis and trans isomers may be regulated by the choice of the solvent for the acetylenic glycol present during the hydrogenation.

While it is preferred to use in the process a nickel catalyst of the hereinbefore described Raney type which has been activated by the addition of even very small amounts of an alkaline compound, other nickel catalysts thus activated, such as electrolytic nickel activated by potassium hydroxide, effectively may be used, though usually with smaller yields of the ethylenic glycols.

The term "Raney type nickel catalyst" as used in the claims is intended to designate a nickel catalyst prepared in the manner described in the United States Patent 1,628,190 of Murray Raney, whereby an alloy of nickel with metals such as silicon and aluminum in various proportions, and in finely-divided form, is treated with a solvent for the silicon or aluminum which does not attack the nickel, thereby dissolving the silicon and aluminum from the alloy. The nickel remains in a finely divided state. The solvent used in the treatment preferably is a caustic alkali such as caustic soda. After the solvent treatment the subnatant fluid is decanted and the residue, consisting of finely-divided nickel, is thoroughly washed with water.

The invention is susceptible of modification within the scope of the appended claims.

I claim:

1. Process for producing a 1,4 ethylenic glycol, which comprises hydrogenating a 1,4 acetylenic glycol in the presence of a nickel catalyst activated with a caustic alkali, thereby converting the acetylenic glycol to the corresponding ethylenic glycol, and completing the said conversion while substantially preventing further hydrogenation of the ethylenic glycol.

2. Process for producing a 1,4 ethylenic glycol, which comprises hydrogenating a 1,4 acetylenic glycol in the presence of a "Raney" type nickel catalyst activated with a caustic alkaline, thereby converting the acetylenic glycol to the corresponding ethylenic glycol, and completing the said conversion while preventing further hydrogenation of the ethylenic glycol.

3. Process for producing a 1,4 ethylenic glycol, which comprises hydrogenating a 1,4 acetylenic glycol in the presence of a nickel catalyst activated with a caustic alkali, in the presence of a volatile solvent for the acetylenic glycol, thereby converting the latter substantially completely to the corresponding ethylenic glycol while preventing substantial further hydrogenation of the latter.

4. Process for producing a 1,4 ethylenic glycol, which comprises hydrogenating a 1,4 acetylenic glycol in the presence of a nickel catalyst activated by at least a trace of a caustic alkali, and in the presence of a volatile solvent for the said acetylenic glycol, and recovering the resultant ethylenic glycol from the hydrogenation reaction mixture.

5. Process for producing a 1,4 ethylenic glycol, which comprises hydrogenating a 1,4 acetylenic glycol in the presence of a "Raney" type nickel catalyst activated by at least a trace of a caustic alkali, and in the presence of a volatile solvent for the said acetylenic glycol, removing the catalyst and solvent from the reaction mixture, and recovering the residual ethylenic glycol.

6. Process for producing a 1,4 ethylenic glycol, which comprises hydrogenating a 1,4 acetylenic glycol in the presence of a "Raney" type nickel catalyst activated by at least a trace of a caustic alkali, in the presence of water, removing the catalyst from the reaction mixture, and recovering the residual ethylenic glycol.

7. Process for producing a 1,4 ethylenic glycol, which comprises hydrogenating a 1,4' acetylenic glycol in the presence of a nickel catalyst activated by at least a trace of a caustic alkali, and in the preence of a volatile solvent for the said acetylenic glycol, removing the catalyst and solvent from the reaction mixture, and recovering the residual ethylenic glycol.

8. Process for producing a 1,4 ethylenic glycol, which comprises hydrogenating in the presence of an alkali-activated nickel catalyst and of a volatile solvent for the reactants, a 1,4 acetylenic glycol of the type

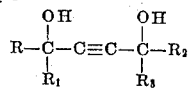

wherein R, $R_1$, $R_2$, and $R_3$ respectively designate the same or a different member selected from the group consisting of hydrogen, alkyl radicals and aryl radicals, thereby partially saturating the triple bond of the acetylenic glycol and yielding the corresponding ethylenic glycol while preventing further reduction of the latter, and removing the catalyst and solvent from the said ethylenic glycol.

9. Process for producing a 1,4 ethylenic glycol, which comprises reducing a 1,4 acetylenic glycol in the presence of a nickel catalyst and at least a trace of a caustic alkali, together with a volatile solvent for the acetylenic glycol, removing the catalyst and the said solvent from the resultant reaction mixture, and recovering the 1,4 ethylenic glycol thus precipitated.

10. Process for producing a 1,4 ethylenic glycol, which comprises hydrogenating a 1,4 acetylenic glycol in the presence of a nickel catalyst and at least a trace of a caustic alkali and water, and separating from the resultant aqueous solution the 1,4 ethylenic glycol thus produced.

11. Process as defined in claim 10 wherein caustic soda is employed as the caustic alkali.

12. Process for producing 2,5-dimethyl-2,5-dihydroxyhexene-3, which comprises hydrogenating 2,5-dimethyl-2,5-dihydroxyhexyne-3 in the presence of a volatile solvent for the latter and of a nickel catalyst activated with a caustic alkali, thereby converting the former to 2,5-dimethyl-2,5-dihydroxyhexene-3, and thereafter removing from the latter the said catalyst and volatile solvent.

13. Process for producing 2,5-dimethyl-2,5-dihydroxyhexene-3, which comprises hydrogenating 2,5-dimethyl-2,5-dihydroxyhexyne-3 in the presence of a volatile solvent for the latter and of a "Raney" type nickel catalyst activated with a caustic alkali, thereby converting the former to 2,5-dimethyl - 2,5 - dihydroxyhexene - 3, and thereafter removing from the latter the said catalyst and volatile solvent.

14. Process for producing 2,5-dimethyl-2,5-dihydroxyhexene-3, which comprises hydrogenating 2,5-dimethyl-2,5-dihydroxyhexyne-3 in the presence of a volatile solvent for the latter and of a nickel catalyst activated with a caustic alkali, at a temperature below the boiling point of the said solvent, thereby converting the 2,5-dimethyl- 2,5-dihydroxyhexyne-3 to 2,5-dimethyl-2,5-dihydroxyhexene-3, and substantially completing the said conversion in the absence of further hydrogenation of the 2,5-dimethyl-2,5-dihydroxyhexene-3.

15. Process for producing 2,5-dimethyl-2,5-dihydroxyhexene-3, which comprises hydrogenating 2,5-dimethyl-2,5-dihydroxyhexyne-3 in solution in water, in the presence of a "Raney" type nickel catalyst activated by a caustic alkali, thereby converting the former to 2,5-dimethyl-2,5-dihydroxyhexene-3, removing the catalyst from the resultant reaction mixture, and recovering the 2,5-dimethyl-2,5 - dihydroxyhexene-3 substantially free from products of further hydrogenation of the latter.

16. In the process for producing a 1,4 ethylenic glycol which involves the catalytic hydrogenation of a 1,4 acetylenic glycol, in the presence of a nickel catalyst and of a solvent for the 1,4 acetylenic glycol, the step of regulating the production of the trans-isomer of such 1,4 ethylenic glycol which comprises employing water as the said solvent.

17. In the process for producing a 1,4 ethylenic glycol which involves the catalytic hydrogenation of a 1,4 acetylenic glycol, in the presence of a nickel catalyst and of a solvent for the 1,4 acetylenic glycol, the step of regulating the production of the cis-isomer of such 1,4 ethylenic glycol, which comprises conducting the hydrogenation in the presence of an organic solvent for the 1,4 acetylenic glycol.

THOMAS H. VAUGHN.